US010817672B2

(12) United States Patent
Hebert

(10) Patent No.: US 10,817,672 B2
(45) Date of Patent: Oct. 27, 2020

(54) NATURAL LANGUAGE UNDERSTANDING (NLU) PROCESSING BASED ON USER-SPECIFIED INTERESTS

(71) Applicant: Nuance Communications, Inc., Burlington, MA (US)

(72) Inventor: Matthieu Hebert, Melocheville (CA)

(73) Assignee: Nuance Communications, Inc., Burlington, MA (US)

(*) Notice: Subject to any disclaimer, the term of this patent is extended or adjusted under 35 U.S.C. 154(b) by 0 days.

(21) Appl. No.: 14/503,469

(22) Filed: Oct. 1, 2014

(65) Prior Publication Data
US 2016/0098393 A1    Apr. 7, 2016

(51) Int. Cl.
*G10L 15/18* (2013.01)
*G06F 40/40* (2020.01)
*G10L 15/183* (2013.01)
*G06F 16/33* (2019.01)
*G06F 16/683* (2019.01)

(52) U.S. Cl.
CPC .......... *G06F 40/40* (2020.01); *G06F 16/3344* (2019.01); *G06F 16/685* (2019.01); *G10L 15/183* (2013.01)

(58) Field of Classification Search
CPC .............. G10L 15/18; G06F 17/30654; G06F 17/30734; G06F 17/30867
USPC ...................................................... 704/9, 235
See application file for complete search history.

(56) References Cited

U.S. PATENT DOCUMENTS

| | | | | |
|---|---|---|---|---|
| 6,112,186 A * | 8/2000 | Bergh | ............... | G06F 17/30699 705/14.37 |
| 6,304,864 B1 * | 10/2001 | Liddy | ............... | G06F 17/30867 706/15 |
| 7,383,172 B1 * | 6/2008 | Jamieson | ............ | G06F 17/2785 704/9 |
| 2008/0087313 A1 * | 4/2008 | Jang | ........................ | E04H 15/44 135/145 |
| 2008/0091406 A1 * | 4/2008 | Baldwin | ................. | G10L 15/22 704/4 |
| 2009/0150156 A1 * | 6/2009 | Kennewick | ........ | G06Q 30/0261 704/257 |
| 2010/0114944 A1 * | 5/2010 | Adler | ............................ | 707/770 |
| 2010/0281025 A1 * | 11/2010 | Tsatsou | ............. | G06F 17/30699 707/733 |
| 2011/0029301 A1 | 2/2011 | Han et al. | | |

(Continued)

OTHER PUBLICATIONS

International Search Report and Written Opinion for International Application No. PCT/US2015/053231 dated Feb. 8, 2016.

*Primary Examiner* — Jakieda R Jackson
(74) *Attorney, Agent, or Firm* — Wolf, Greenfield & Sacks, P.C.

(57) ABSTRACT

Methods and apparatus for natural language understanding (NLU) processing based on user-specified interests. Information specifying a weight for each of a plurality of domains is received via a user interface. The plurality of domains each relates to a potential area of interest for the user, and the weight for a domain from among the plurality of domains indicates a level of interest for the user in the domain. A ranking classifier used to rank NLU hypotheses generated by an NLU engine is trained using training data from which features are, at least in part, based on the information specifying a weight for each of the plurality of domains.

23 Claims, 8 Drawing Sheets

(56) References Cited

U.S. PATENT DOCUMENTS

| | | | | |
|---|---|---|---|---|
| 2011/0282892 | A1* | 11/2011 | Castellani | G06F 17/30389 707/766 |
| 2011/0313762 | A1* | 12/2011 | Ben-David | G10L 13/08 704/231 |
| 2012/0036137 | A1* | 2/2012 | Naidu | G06F 17/30648 707/748 |
| 2012/0303561 | A1* | 11/2012 | Sathish | G06F 17/30873 706/14 |
| 2013/0246098 | A1* | 9/2013 | Habboush | G06Q 10/10 705/3 |
| 2013/0297304 | A1 | 11/2013 | Kim et al. | |
| 2014/0074650 | A1* | 3/2014 | Elias | G06F 17/30867 705/26.7 |
| 2014/0163959 | A1* | 6/2014 | Hebert | G06F 16/3344 704/9 |
| 2014/0257793 | A1 | 9/2014 | Gandrabur et al. | |
| 2014/0278362 | A1* | 9/2014 | Gerken, III | G06F 17/278 704/9 |
| 2014/0359421 | A1* | 12/2014 | Allen | G06F 17/241 715/230 |
| 2014/0365209 | A1* | 12/2014 | Evermann | G06F 17/279 704/9 |
| 2015/0142420 | A1* | 5/2015 | Sarikaya | G06F 17/279 704/9 |
| 2015/0254561 | A1* | 9/2015 | Singal | G06F 17/30507 707/713 |
| 2015/0332672 | A1* | 11/2015 | Akbacak | G10L 15/18 704/257 |
| 2015/0339290 | A1* | 11/2015 | Mueller | G06F 16/221 704/9 |
| 2015/0356260 | A1* | 12/2015 | D'Souza | G06F 19/328 705/2 |
| 2016/0132590 | A1* | 5/2016 | Byron | G06F 17/30867 707/734 |
| 2017/0230720 | A1* | 8/2017 | Archibong | H04N 21/4788 |
| 2018/0012597 | A1* | 1/2018 | Mathias | G10L 15/26 |

* cited by examiner

FIG. 5A

| TEXT | NLU | LM SCORE | USER WEIGHTS |
|---|---|---|---|
| Play Harry Potter | 1.1 Movie | 0.9 | 0.0 |
| | 1.2 OpenApp | 0.75 | 0.2 |
| | 1.3 Book | 0.8 | 0.1 |
| | 1.4 Music | 0.4 | 0.9 |

FIG. 5B

Features
(1.1, Movie, 0.9, 0.0)
(1.2, OpenApp, 0.75, 0.2)
(1.3, Book, 0.8, 0.1)
(1.4, Music, 0.4, 0.9)

Target (0=wrong, 1=correct)
0
0
0
1

NATURAL LANGUAGE UNDERSTANDING (NLU) PROCESSING BASED ON USER-SPECIFIED INTERESTS

BACKGROUND

Some electronic devices, such as smartphones and tablet computers, include or are associated with a natural language understanding (NLU) engine that interprets user input to provide meaningful output or to facilitate actions with one or more applications accessible via the electronic device. Virtual agents or virtual assistants are one such class of applications that benefit from NLU processing to assist users in performing functions such as searching for content on a network (e.g., the Internet) and interfacing with other applications. Users can interact with a virtual agent by typing, touch, speech, or some other interface. To determine a meaning of a user input, the NLU engine interprets the user input, and a virtual agent may attempt to infer an action the user wants to perform based on the NLU result.

SUMMARY

One embodiment is directed to a method of training a ranking classifier used by a natural language understanding (NLU) engine to rank NLU hypotheses generated by the NLU engine for a user of a computer system. The method comprises acts of receiving, via a user interface, information specifying a weight for each of a plurality of domains, wherein the plurality of domains each relates to a potential area of interest for the user, wherein the weight for a domain from among the plurality of domains indicates a level of interest for the user in the domain, and training the ranking classifier using training data from which features are, at least in part, based on the information specifying a weight for each of the plurality of domains.

Another embodiment is directed to a non-transitory computer-readable storage medium encoded with a plurality of instructions that, when executed by a computer, performs a method. The method comprises an act of processing, using a natural language understanding (NLU) engine, a textual representation for an input provided by a user to determine an NLU output, wherein the processing the textual representation is performed based, at least in part, on user-specific information associating a weight with each of a plurality of domains, wherein the plurality of domains each relates to a potential area of interest for the user, and wherein the weight associated with the each of the plurality of domains indicates a level of interest for the user in the corresponding domain.

Another embodiment is directed to a computer system, comprising a user interface configured to receive information specifying a weight for each of a plurality of domains, wherein the plurality of domains each relates to a potential area of interest for the user, wherein the weight for a domain from among a plurality of domains indicates a level of interest for the user in the domain, and at least one processor. The at least one processor is programmed to train a ranking classifier using training data from which features are, at least in part, based on the information specifying a weight for each of the plurality of domains.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

In the accompanying drawings, each identical or nearly identical component that is illustrated in various figures is represented by a like numeral. For purposes of clarity, not every component may be labeled in every drawing. In the drawings:

FIGS. 5A and 5B show illustrative feature sets that may be included as training data to train a ranking engine in accordance with some embodiments;

DETAILED DESCRIPTION

Some systems that include NLU engines perform in a customized way based upon historical usage information collected from particular users. For example, a query for information on the Internet relating to a professional athlete who also has a high profile in popular culture could potentially return information from sports related websites (e.g., relating to athletic performance, sports statistics, etc.) and/or information from websites related to popular culture (e.g., photos of the athlete at public events, dating information, other celebrity gossip, etc.). The information of interest may vary from user to user. Over time, if a first user demonstrates (e.g., based on which returned links are selected) an interest in sports but not popular culture, some NLU engines will learn from this historical information and use it to bias future results returned for that user (e.g., by returning sports-related content rather than popular culture content when a query associated with a sports figure is received). Conversely, for a different user who demonstrates an interest in popular culture and little interest in sports, some NLU engines will learn over time the preferences for this user and bias results returned to popular culture rather than sports.

The inventors have recognized that new users of a system that includes an NLU engine have no historical information, so that the NLU engine cannot provide a personalized user experience until the user has used the system for a (potentially lengthy) period of time. Additionally, users of such systems do not have control to override the personalization bias of the NLU engine should the user's interests change over time. To this end, some embodiments of the invention are directed to providing a user interface that enables a user to specify predetermined information (e.g., via a set of weights) for one or more of a plurality of categories (also called "domains" herein), wherein the predetermined information reflects the user's interest in receiving NLU results associated with one or more of those particular domains. As discussed in further detail below, some NLU engines may include a ranking engine that may be trained and/or adapted using the predetermined information in any suitable manner to personalize the user's experience based upon the provided information.

The techniques described herein may be implemented in any application or system that uses NLU-based processing. In some embodiments, described below, a NLU engine using the techniques described herein may be used to facilitate interactions between a user and a virtual agent (e.g., implemented as an application executing on an electronic device such as a smartphone). However, this is but one illustrative use for the techniques described herein, as they may be used with any NLU engine in any environment.

Figure 1:
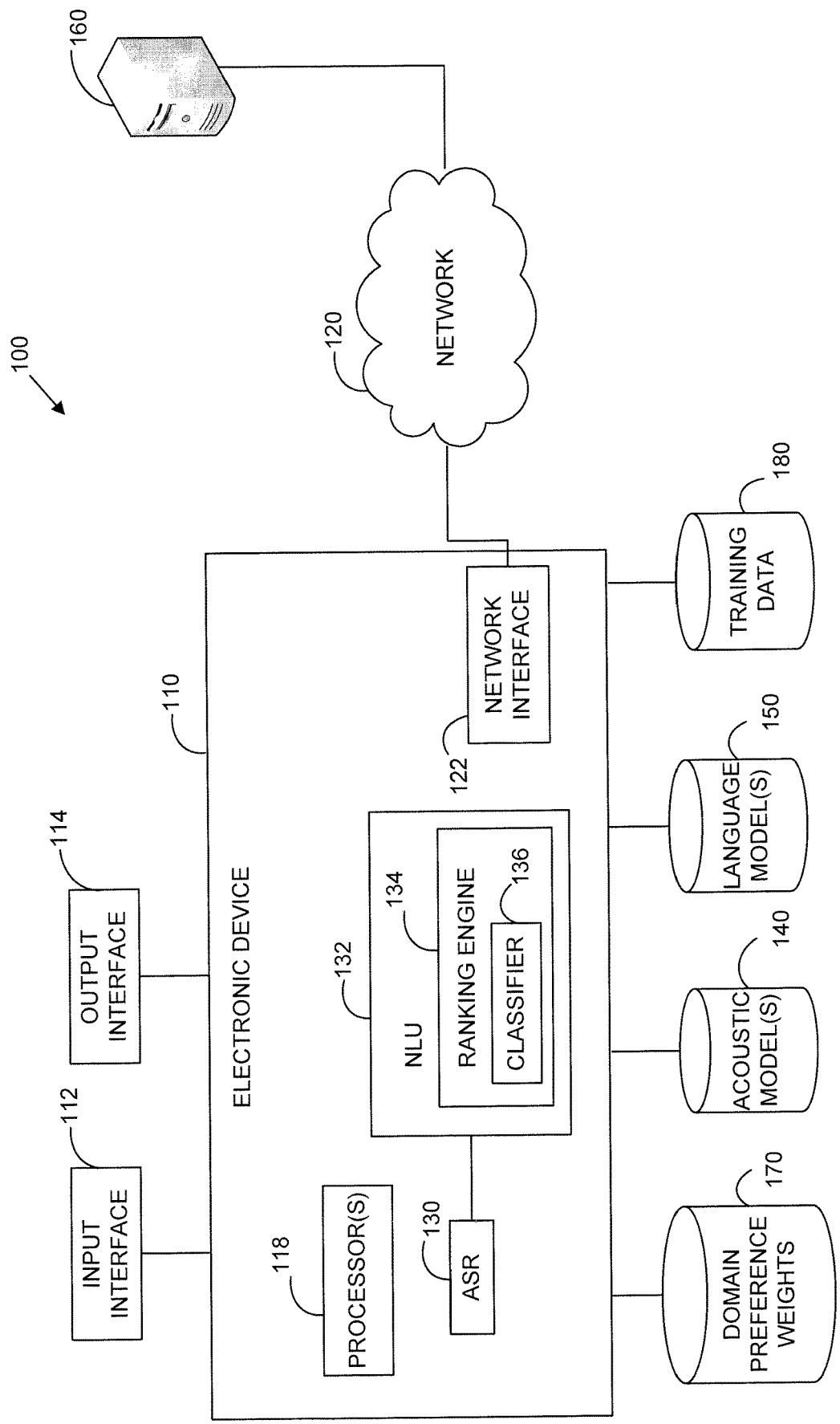
FIG. 1 is schematic of an exemplary computing environment in which some embodiments of the invention may be implemented.

FIG. 1 shows an illustrative computing environment 100 that may be used in accordance with some embodiments of the invention. Computing environment 100 includes electronic device 110. Electronic device 110 includes input interface 112 configured to receive user input. The input interface may take any form as the aspects of the invention are not limited in this respect. In some embodiments, input interface 112 may include multiple input interfaces each configured to receive one or more types of user input. For example, input interface 112 may include a keyboard (e.g., a QWERTY keyboard), a keypad, a touch-sensitive screen, a mouse, or any other suitable user input device. As another example, input interface may include a microphone that, when activated, receives speech input and performs automatic speech recognition (ASR) either locally on the electronic device, remotely (e.g., on a server), or distributed between both. The received speech input may be stored in a datastore associated with electronic device 110 to facilitate the ASR processing.

Electronic device 110 also includes output interface 114 configured to output information from electronic device 110. The output interface may take any form as aspects of the invention are not limited in this respect. In some embodiments, output interface 114 may include multiple output interfaces each configured to provide one or more types of output. For example, output interface 114 may include one or more displays, one or more speakers, or any other suitable output device. Applications executing on electronic device 110 may be programmed to display a user interface to facilitate the performance of one or more actions associated with the application. In one example described herein, the application displays a user interface that enables a user to provide predetermined information (e.g., weights) for each of a plurality of domains that describe potential areas of interest for the user, as described in more detail below. In the example below, the predetermined information specified by a user for each of a plurality of domains is a weight that reflects the relative importance of the domain to the particular user's interests. It should be appreciated however, that any suitable predetermined information that reflects the interests of a user or class of users may alternatively be used to specify user preferences.

Electronic device 110 also includes one or more processors 118 programmed to execute a plurality of instructions to perform one or more functions on electronic device 110. Exemplary functions include, but are not limited to, facilitating the storage of user input, launching and executing one or more applications on electronic device 110, and providing output information via output interface 114. Exemplary functions also include performing speech recognition (e.g., using ASR engine 130) and performing natural language understanding (e.g., using NLU engine 132), as discussed in more detail below.

Electronic device 110 also includes network interface 122 configured to enable electronic device 110 to communicate with one or more computers via network 120. Some embodiments may be implemented using a client/server system where at least a portion of an ASR and/or an NLU process is performed remotely from electronic device 110. In such embodiments, network interface 122 may be configured to provide information to one or more server devices 160 to perform ASR, an NLU process, or some other suitable function. Network 120 may be implemented in any suitable way using any suitable communication channel(s) enabling communication between the electronic device and the one or more computers. For example, network 120 may include, but is not limited to, a local area network, a wide area network, an Intranet, the Internet, or any suitable combination of local and wide area networks. Additionally, network interface 122 may be configured to support any of the one or more types of networks that enable communication with the one or more computers.

In some embodiments, electronic device 110 is configured to process speech received via input interface 112 to produce at least one speech recognition result using an automatic speech recognition (ASR) engine 130. ASR engine 130 is configured to process audio including speech using automatic speech recognition to determine a textual representation corresponding to at least a portion of the speech. ASR engine 130 may implement any type of automatic speech recognition to process speech, as the techniques described herein are not limited by the particular automatic speech recognition process(es) used. As one non-limiting example, ASR engine 130 may employ one or more acoustic models 140 and/or language models 150 to map speech data to a textual representation. These models may be speaker independent, or one or both of the models may be associated with a particular speaker or class of speakers. Additionally, the language model(s) 150 may include domain-independent models used by ASR engine 130 in determining a recognition result and/or models that are tailored to a specific domain. When the models are domain-specific, the domain-specific models may optionally be used in connection with a natural language understanding (NLU) system (e.g., NLU engine 132), as discussed in more detail below. ASR engine 130 may output any suitable number of recognition results, as aspects of the invention are not limited in this respect. In some embodiments, ASR engine 130 may be configured to output N-best results determined based on an analysis of the input speech using acoustic and/or language models, as described above.

Electronic device 110 also includes NLU engine 132 configured to process a textual representation to gain some understanding of the input, and output one or more NLU hypotheses based, at least in part, on the textual representation. In some embodiments, the textual representation processed by NLU engine 132 may comprise one or more ASR results (e.g., the N-best results) output from an ASR engine (e.g., ASR engine 130), and the NLU engine may be configured to generate one or more NLU hypotheses for each of the ASR results. It should be appreciated that NLU engine 132 may process any suitable textual representation regardless of whether it was output as a result of an ASR process. For example, a textual representation entered via a keyboard, a touch screen, or received using some other input interface may alternatively (or additionally) be processed by an NLU engine in accordance with the techniques described herein. Additionally, text-based results returned from a search engine or provided to electronic device 110 in some other way may also be processed by an NLU engine in accordance with one or more of the techniques described herein. The NLU engine and the form of its outputs may take any of numerous forms, as the techniques described herein are not limited to use with NLU engines that operate in any particular manner.

In some embodiments, each of the NLU hypotheses generated by the NLU engine for a textual representation may be associated with a domain that reflects a proposed category of interest assigned to the textual representation. An NLU hypothesis may also be associated with information other than a domain, as aspects of the invention are not limited in this respect. In embodiments that include an ASR engine, each ASR result may be associated with one NLU hypothesis or multiple NLU hypotheses, with each of the multiple hypothesis being associated with a different domain. When multiple hypotheses are provided, a confidence score or other indication of the likelihood of the assigned domain being correct may be provided.

As discussed above, if an NLU-based engine is not tailored to the interest of a particular user (or class of users), it may provide outputs that are not well suited to the personal interests of a particular user. Some embodiments of the invention include techniques for biasing output associated with the NLU engine based on user preferences specifying areas of interest for a particular user. In some embodiments, the biasing is provided by ranking engine 134 associated with NLU engine 132. Although ranking engine 134 is illustrated in FIG. 1 as being a portion of NLU engine 132, in some embodiments, ranking engine 134 may be implemented separately from NLU engine 132, and may be arranged to receive unranked hypotheses from NLU engine 132. As discussed in further detail below, in some embodiments, ranking engine 134 is configured to re-rank or reorder hypotheses generated by NLU engine 132 based on information about the user preferences provided to the ranking engine.

User preferences may be explicitly or implicitly provided by a user to ranking engine 134 via any suitable user interface, as discussed in more detail below. This may be done when the user begins using the system for the first time, or after the user has been using the system for a period of time (e.g., to alter the way the NLU engine understands the user's preferences from what the user's historical usage data indicated). As a user uses the electronic device associated with the NLU engine after the preferences are selected, the predetermined information (e.g., weights) associated with user preferences may be updated in the ranking engine based on usage information that tracks the behavior of the user (e.g., the user selects music related search results 90% of the time, but selects sports results only 5% of the time). Usage information may be tracked and the weights for domains may be updated in any suitable manner, as embodiments of the invention described herein are not limited in this respect. For example, in some embodiments, a domain assigned to an NLU hypothesis that is selected as a correct result by a user may be used to update the corresponding weight for the domain. The weights may be updated based on usage information at any frequency, as embodiments of the invention are not limited in this respect, so that any suitable update frequency may be used. For example, weights may be updated weekly, monthly, or at any other suitable time interval. In some embodiments, an output visualization or report describing how the weights for different domains have changed and/or have been updated at a single point in time or over multiple points in time may be provided to a user, and the user may be able to override the updated weights by interacting with a user interface, as discussed in more detail below.

The ranking engine may use the domain weights to influence the behavior of the system in any suitable way. In one embodiment, the ranking engine may use the domain weights to influence a web-based search process. For example, if a user sets one or more domain weights to indicate that the user is strongly interested in music, but not generally interested in sports, when the user interacts with a virtual agent and says "search Boston," the ranking engine may interpret this search query based on the user preferences to determined that the user is likely interested in searching for information about the musical group "Boston" rather than searching for information about Boston sports teams.

The ranking engine may use this information in any suitable way to provide the user with search results tailored to the user's preferences. In one implementation of this embodiment, the ranking engine may determine a domain for a search query and a search engine may be selected based, at least in part, on the determined domain. The determination of the domain for the search query may be influenced by the domain weights specified by the user in any suitable way including, but not limited to, ranking domain hypotheses generated by the NLU engine based, at least in part, on the domain weights. In response to determining a domain for the search query, a search engine that is specific to a site (e.g., a particular website) or that specializes in content (rather than a general purpose search engine such as Google™, Bing™, Yahoo™, etc.) may be selected based on domain. For example, if the domain is "Food," a restaurant search engine may be selected, if the domain is "Books," an online bookstore's site-specific search engine may be selected, if the domain is "Music," an application-specific search engine for searching a collection of music may be selected, etc. The particular search engine selected using the domain information may be determined in any suitable way, as the techniques described herein are not limited in this respect. For example, associations between domains and search engines may be stored locally on the electronic device or remotely from electronic device (e.g., on a network-connected datastore), and the stored information may be accessed during a searching process to select an appropriate search engine corresponding to a determined domain for a search query. After selecting one or more search engines for the search query, the query may be sent to the selected search engine(s), and results returned from the search engine(s) may be presented to the user.

In another implementation, the NLU engine may be configured to use the domain weights to modify a search query sent to a domain-independent web search engine (e.g., a general purpose search engine). The search query may be modified in any suitable way to include information about the domain determined by the NLU engine. For example, if the NLU engine determines that the domain for the query "search Boston" is Music, the query may be modified to "search Boston music," and this modified search query may be sent to a web search engine. Accordingly in accordance with some embodiments, domain information reflecting preferences of a user may be taken into account during web searching, even when such domain information is not explicitly provided by the user in the search query.

In another implementation, the domain weights may be used to filter and/or rank search results provided by one or more search engines. Search engines often provide search results ranked in terms of relevance to a search query. The search results provided by one or more search engines may be further filtered and/or ranked based, at least in part on the domain weights in any suitable way. As one non-limiting example, the domain weights may be used to provide a subset of the search results returned from a search engine to the user. For example, if the NLU engine determines that the domain for a search query is "Music," the set of search results returned from a search engine may be filtered to only provide search results to the user that relate to music. Alternatively, all of the search results returned from the search engine may be provided to the user, with the search results being ranked based, at least in part, on the domain-weights for the user. For example, music-related search results may be associated with a higher ranking than sports-related search results, and this ranking may be reflected in the way in which the search results are provided to the user in any suitable way (e.g., providing higher-ranked results first, visually indicating which results are higher ranked, etc.).

Several illustrative techniques for using domain weights to influence a search process in accordance with some embodiments of the invention have been described above. It should be appreciated that there are other ways in which the domain weights may be used to influence search results returned from a search process, and the techniques described above are provided merely as examples. Additionally, the techniques described above for using domain weights to influence a search process may be used either alone or in any combination, and may also be used with any other suitable techniques for influencing a search process, as embodiments of the invention are not limited in this respect.

In accordance with another embodiment, a selection of one of a plurality of NLU hypotheses generated by NLU engine 132 is biased by ranking engine 134 based, at least in part, on user preference information specifying weights for each of a plurality of domains. This biasing may be performed in any suitable way. In some embodiments, biasing is achieved by having the NLU hypotheses rankings influenced based, at least in part, by the user preference information. To inform or influence the ranking process, in some embodiments, ranking engine 134 includes a ranking classifier 136 that classifies the NLU hypotheses based, at least in part, on weights for each of a plurality of domains specified by a user, as discussed in more detail below. Domain preference weights 170 for each of the plurality of domains may be stored in any datastore accessible by ranking classifier 136. Prior to its use during run-time, the ranking classifier 136 may be trained using training data 180 that is weighted based, at least in part, on information specifying a weight for each of the plurality of domains. An illustrative process for training a ranking classifier is discussed in more detail below.

The domain information may be used to influence an NLU process in any suitable way, and the techniques described above are non-limiting examples of ways in which the domain information may be used. It should be appreciated that these techniques and others may be used separately or in any combination in the same system or different systems, as embodiments of the invention are not limited in this respect.

The electronic device 110 shown in FIG. 1 includes both ASR and NLU functionality being performed locally on the electronic device 110. In some embodiments, some or all of these processes may be performed by one or more computers (e.g., server 160) remotely located from electronic device 110. For example, in some embodiments that include an ASR component, speech recognition may be performed locally using an embedded ASR engine associated with electronic device 110, a remote ASR in network communication with electronic device 110 via one or more networks, or speech recognition may be performed using a distributed ASR system including both embedded and remote components. In some embodiments, NLU engine 132 and/or ranking engine 134 may be located remotely from electronic device 110 and may be implemented using one or more of the same or different remote computers configured to provide remote ASR. Additionally, it should be appreciated that resources used in accordance with any one or more of ASR engine 130, NLU engine 132, ranking engine 134, or ranking classifier 136 may also be located remotely from electronic device 110 to facilitate the ASR and/or NLU processes described herein, as aspects of the invention related to these processes are not limited in any way based on the particular implementation or arrangement of these components within a computing environment 100.

Figure 2:
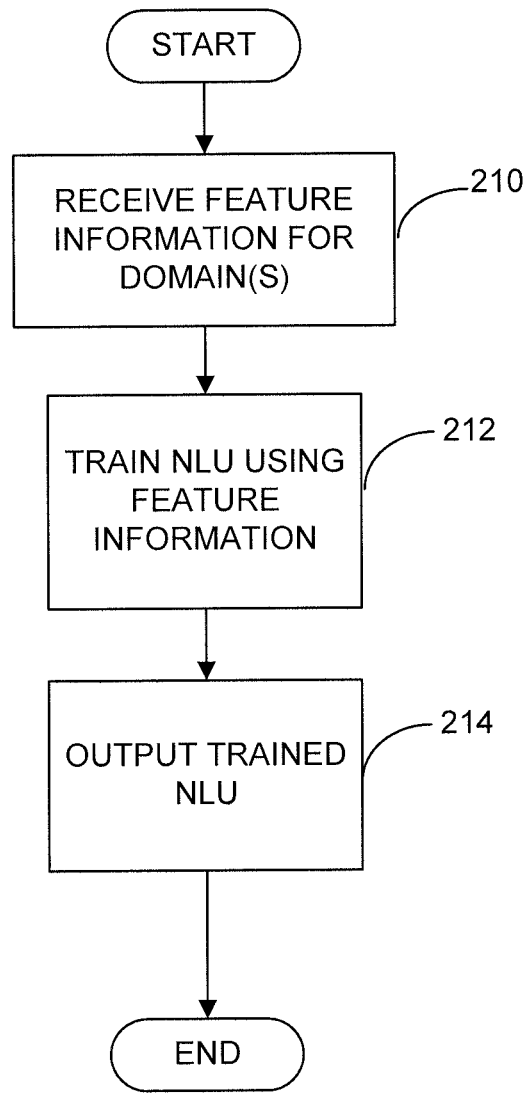
FIG. 2 is a flowchart of an illustrative process for creating a trained ranking engine in accordance with some embodiments of the invention.

FIG. 2 shows an illustrative process for training a ranking classifier to select an NLU hypothesis that may be used in accordance with some embodiments of the invention. In act 210, feature information for each of a plurality of domains is received. Any suitable feature information used to train the ranking classifier may be received. For example, as discussed below in connection with FIGS. 5A and 5B, features including, but not limited to, user weights and language model scores may be received, and some or all of the received feature information may be used to train the ranking classifier.

As described in more detail below, the weights may be specified by a user using any suitable input interface. After the weights for each of the plurality of domains has been specified, the process proceeds to act 212 where the ranking classifier is trained to reflect the user's indication of his/her areas of interest. For example, at least some of the weights may be used to produce a set of feature information, and the set of feature information may be used to train the ranking classifier. By providing users with a vehicle to directly express (as opposed to indirectly expressing through a series of actions over time by using the system), which domains they are more interested in, the results returned from the NLU engine can be customized to the interests of the user immediately, rather than requiring the user to use the system and have the ranking engine learn the user's interests over time. In addition (or alternatively), should the user change their user preferences, predetermined information directly specified by a user may be used by the ranking engine to override user preferences that the ranking engine has learned through use of the system, so that results returned by the ranking engine reflect the user's changed preferences rather than the user preferences learned through use of the system.

After the ranking classifier is trained, the process proceeds to act 214 where the trained ranking classifier is output. In some embodiments where the ranking classifier is stored, trained, and used locally by the electronic device (e.g., without using server 160), outputting the trained classifier may comprise determining that the classifier is ready for use by the electronic device to classify NLU hypotheses and configuring it for use. Alternatively, the trained ranking classifier may be sent from a device on which the ranking classifier is trained to another device or computer via one or more networks. For example, if the ranking classifier is trained by a device remotely located from the electronic device, the trained ranking classifier may be output from the remotely-located device to the electronic device. Alternatively, the ranking classifier may be trained locally on the electronic device and after training, the trained ranking classifier may be output to a network-connected device that is used to generate NLU hypotheses, or to any other suitable device other than the device on which the ranking classifier was trained. As described above, which particular components of computing environment 100 perform one or more of the processes of automatic speech recognition, natural language processing, or ranking classification, does not limit aspects of the invention, and the trained ranking classifier may be output to be stored in association with any appropriate computing device in computing environment 100 to implement one or more of the techniques described herein.

Figure 3:
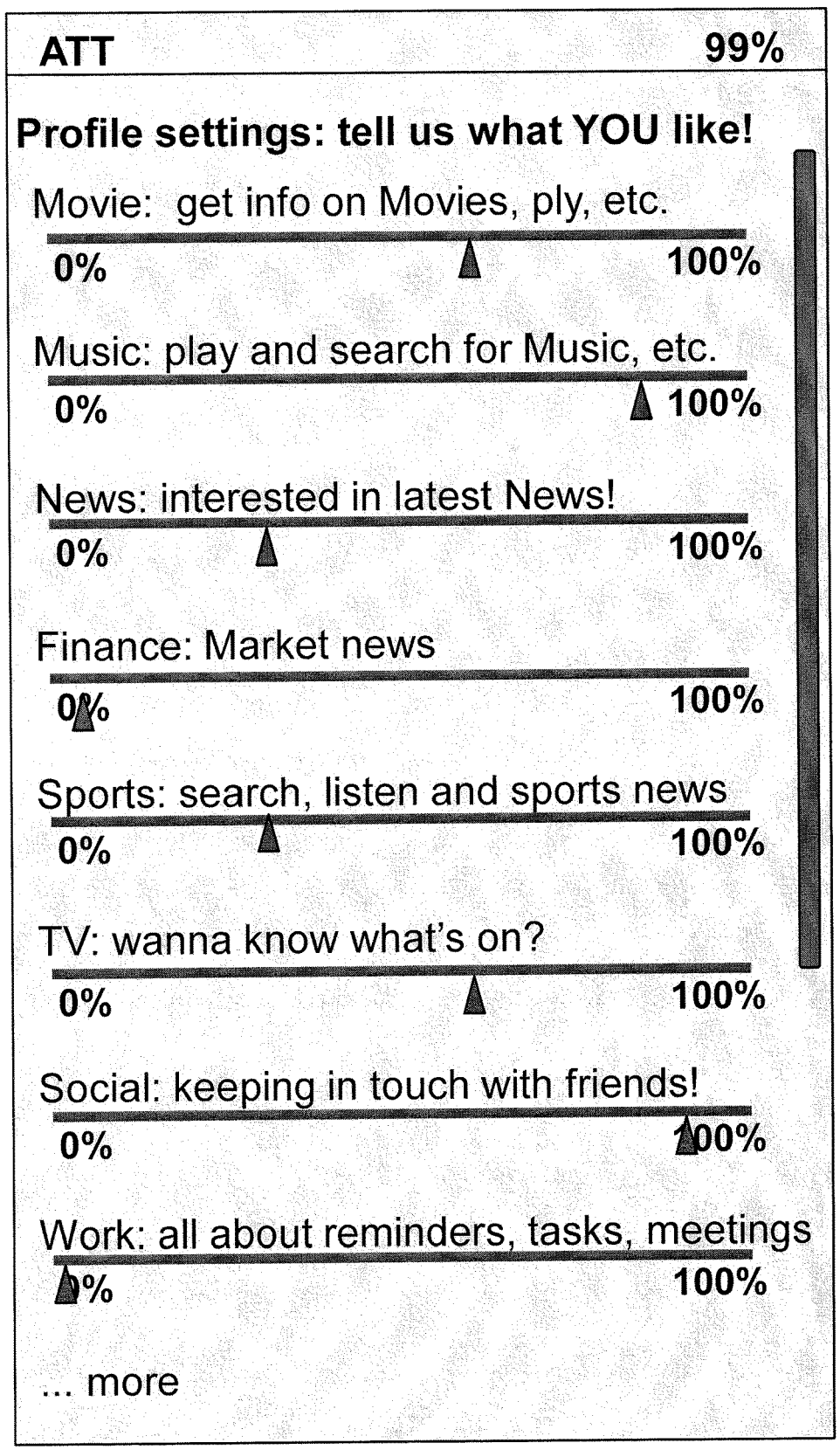
FIG. 3 is an illustrative user interface for specifying weights for a plurality of domains, wherein the weights are used to train a ranking engine in accordance with some embodiments of the invention.

In some embodiments, feature information (e.g., weights) for each domain may be explicitly specified by a user interacting with a user interface presented on a display of an electronic device. FIG. 3 illustrates a non-limiting example of a user interface that may be used in accordance with some embodiments of the invention. The user interface of FIG. 3 includes a plurality of domain slider bars with which a user may interact to specify a level of interest associated with the corresponding domains. The domains illustrated in FIG. 3 include Movie, Music, News, Finance, Sports, TV, Social, and Work. It should be appreciated that different domains may be used in addition to or instead of any of the domains shown in FIG. 3 including, but not limited to, Gossip, Books, Science, Health, Cooking, and Religion. Any suitable number or type of domains may be used, as aspects of the invention are not limited in any way by the particular domains or combinations thereof.

The domains discussed above relate to types of content that may be of interest to a user. Other domains may relate to user preferences regarding commands or actions to be performed on an electronic device. For example, domains related to commands or actions may include, but are not limited to, a WebSearch domain associated with performing a web search action, an OpenApp domain associated with performing an action of opening an application on or accessible via the electronic device, and a PhoneSettings domain associated with changing phone settings (e.g., volume, ringtone, vibrate mode). Additionally, users preferences for performing actions in response to particular commands may be specified using domain weights specified in accordance with the techniques described herein. For example, the electronic device may be configured to play music using multiple applications (e.g., iTunes™, Spotify™, Pandora™), and a user may specify domain weights associated with user preferences for launching a particular application in response to a command to play music.

In some embodiments, a user may interact with a user interface (e.g., the user interface of FIG. 3) to select a weight for a command or action domains to specify a user preference in performing the command or action. For example, if a user would like to use the Spotify™ application 80% of the time to listen to music and use the iTunes™ application 20% of the time to listen to music, the use may specify weights for each of these command domains, as discussed above. Continuing with this example, after setting the domain weights for Spotify™ and iTunes™, the system may be configured according to the user's preferences by responding to the user utterance "Play 'Yesterday'" by launching Spotify™ and playing the song "Yesterday" by the Beatles. If another user had specified a domain weight of 20% for Spotify™ and 80% for iTunes™, the system may respond to the same input "Play Yesterday," differently by launching iTunes™ and playing the song "Yesterday" from the user's iTunes™ library. The domain weights discussed above are provided as percentages, though it should be appreciated that the domain weights may be provided in any other suitable way, as embodiments of the invention are not limited in this respect.

In some embodiments, the domain weights may be used in combination with other information to determine a particular action to take or command to perform in response to user input. For example, although a user may have specified domain weights of 80% for iTunes™ and 20% for Spotify™, if the system cannot find a match to the song "Yesterday" in the user's iTunes™ library, the Spotify™ application may be launched instead. As another example, although a user may have specified domain weights of 80% for Spotify™ and 20% for iTunes™, if the system determines that the Spotify™ service is unavailable (e.g., because the user's account requires a wireless connection and none is available), the system may launch iTunes™ rather than Spotify™ in response to the user input "Play Yesterday" despite the user's higher preference to use Spotify for listening to music. Any information (including content-based domain information) may be used in combination with the command or action domain weight information to determine a command or action to perform in response to a user input, as embodiments of the invention are not limited in this respect.

As discussed above, domains weights associated with particular areas of interest (e.g., content, commands, actions) may be configurable by a user by enabling the user to specify the weights using a user interface provided on the electronic device. The inventors have recognized that while it may be intuitive for some users to determine how interested they are in particular content domains (e.g., sports, music, etc.), specifying an interest for some command or action-based domains (e.g., OpenApp, PhoneSettings) may not be as intuitive. To facilitate the setting of weights for domains that may not be intuitive to a user or that are determined to reflect general user behavior, in some embodiments, at least one of the domains may be a user-independent domain associated with a weight that is configured by someone other than the user of the electronic device.

In some embodiments, the weight associated with a user-independent domain may not be configurable by a user by interacting with a user interface. In other embodiments, the weight may be configurable by the user after an initial weight is set by an application programmer, administrator, or other individual other than the user of the electronic device. For example, one or more user-independent domains may be associated with an initial weight set by an application programmer and the initial weight may be configurable by the user by interacting with a user interface. It should be appreciated that any suitable number of user-independent domains (including none) may be used, as embodiments of the invention are not limited by whether and how many user-independent domains are used.

Domain weights may be specified in any suitable way. For example, in some embodiments, weights for user-specific domains may be specified in a settings menu of an application, and weights for user-independent domains may be modified in an advanced settings menu, or only after entering authentication credentials verifying the identity of the user. Alternatively, in some embodiments, a user may not be allowed to modify user-independent domain settings, or may be able to modify user-independent settings in the same manner as user-specific domain settings.

In the illustrative user interface of FIG. 3, a user may interact with a slider bar for each of the domains to specify a weight for the particular domain. As shown in FIG. 3, the weight may be represented as a percentage from 0-100%.

Alternatively, the weight may be specified in any other suitable way. For example, the weight may be represented numerically (e.g., on a scale from 1-10). Although slider bars are shown in FIG. 3, it should be appreciated that any other suitable user interface element or combination of user interface elements may alternatively be used to specify weights for one or all of the domains. For example, drop down menus, text boxes, radio buttons, or any other suitable user interface elements may be used.

In some embodiments, one or more of the weight selectors for the domains presented on the user interface may be linked such that a selection of a weight for one of the domains automatically results in an adjustment of a weight for one or more of the other domains. For example, in some embodiments, the weights assigned to different domains may be required to add up to 100%. As one non-limiting example, in such a system having the domains Music, TV, and Sports, a user may specify a weight of 50% for Music and 50% for TV. In response to providing these selections, the weight for Sports may automatically be set at 0%, such that the sum of weights for the three domains totals 100%. In this example, the weight for the Sports domain may be considered to be directly specified, even though the user has not manipulated the slider (or other user interface element) for that domain.

In some embodiments, one or more of the weights may be initially provided as a recommendation, and the initial weights may be determined based, at least in part, on one or more user characteristics (e.g., age, gender) stored in association with the electronic device. For example, it may be recommended that younger users are more interested in popular culture and older users are more interested in world news events. Other (or alternative) mappings between recommendations and user characteristics may also be used, as embodiments of the invention are not limited in this respect. The user may subsequently modify the initial weights, as discussed above.

A user may interact with the user interface using any suitable input type, as embodiments of the invention are not limited in this respect. For example, a user may use speech input, keyboard input, mouse input, touchscreen input, or some other suitable input to adjust the weight associated with a domain. When using speech input, the user may speak the name of the domain followed by a numerical value or some other indicator to select the weight for the domain. For example, the user may speak "Music 90" to set the weight for the Music domain to a value of 90. Alternatively, the user may describe a relative amount to adjust a weight for a particular domain. For example, the user may speak "Increase Music" to increase the weight of the Music category by a particular amount (e.g., 5 units). In some embodiments, the user may use a combination of input types (e.g., multimodal input) to adjust the weights associated with the domains. For example, in response to determining that the user has spoken "Music," the Music domain may be selected. The user may then use keyboard input (e.g., by using the arrow keys) to adjust the weight for the selected Music domain. Any suitable combination of multimodal input may be used to adjust the weights associated with domains, as the embodiments of the invention are not limited in this respect.

As discussed above, a ranking engine or component thereof (e.g., a ranking classifier) used in accordance with the techniques described herein may be trained using training data 180 prior to its use in ranking NLU hypotheses for a particular user. Appropriate training data 180 to train the ranking classifier may be determined in any suitable way. In one implementation, a plurality of labeled samples of user inputs (e.g., transcriptions of utterances to a system that receives voice input) may be processed in accordance with weights specified by a user for a plurality of domains, to generate the training data. An illustrative process for generating training data weighted, at least in part, based on information specifying a weight for each of a plurality of domains is discussed below in connection with FIG. 4.

Figure 4:
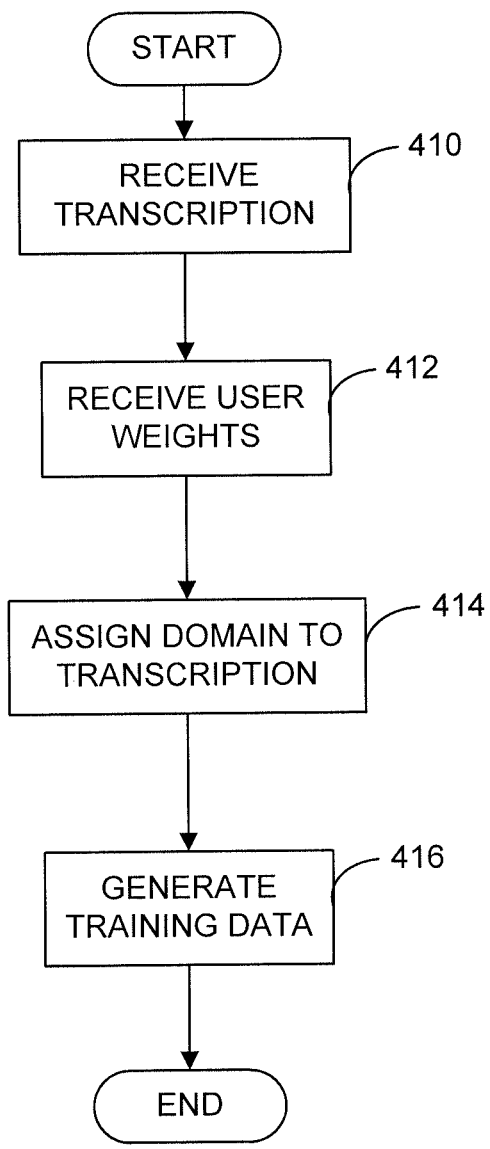
FIG. 4 is a flowchart of an illustrative process for generating training data used to train a ranking engine in accordance with some embodiments of the invention.

In the illustrative process of FIG. 4, processing of a single transcribed utterance from a training set is described for simplicity. It should be appreciated that any suitable number of transcribed utterances may be processed to generate a complete set of training data used to generate ranking training data, as the techniques described herein are not limited in any respect by the size of the training data set. In some embodiments, the training data set may include at least 50,000 transcribed utterances, but fewer may be used in other embodiments. It should be appreciated that training data can be collected (and annotated) from any suitable number and/or type of users. Collecting training data from a wide variety of users may provide generalization capabilities of the trained ranking classifier to new users. Accordingly, the ranking engine, including the ranking classifier, may be shared by some or all users of the same application. Alternatively, multiple trained ranking classifiers may be used for a single application, and embodiments are not limited in this respect.

In act 410, a transcription of an utterance (e.g., an audio file) is selected for processing. In some embodiments, transcriptions may be annotated by a human annotator to assign a domain to each of a plurality of transcriptions in a training set, as discussed in more detail below. The process then proceeds to act 412 where domain weights reflecting areas of interest for a particular user are provided to an annotator. Additional information may also be provided to the annotator including, but not limited to, information describing each of the domains. For example, the information may include one or more examples illustrating the scope of the domain. The process then proceeds to act 414, where a domain is assigned to the transcription based on the domain weights for the user. In addition to the domain weights, the annotator may use any other suitable information, including his/her own knowledge, to assign a domain to the transcription. For example, if the transcription is "play Justin Bieber," and the domain weights specify that the user is interested 80% in Music and 20% in Gossip, the annotator may recognize using his/her own knowledge that Justin Bieber is a musical artist and a celebrity, and based on the user's preferences, the domain Music rather than Gossip may be assigned to the transcription. After each of the transcriptions in the training set has been annotated with a domain, the process proceeds to act 416, where ranking training data is generated. Features in a ranking training data set that include information about user-specific domain weights are described in more detail below with respect to FIGS. 5A and 5B.

FIG. 5A shows one non-limiting example of an illustrative set of features for an input textual representation, wherein the set of features is generated to provide ranking training data in accordance with some embodiments of the invention. As discussed above, to produce training data, an annotator (e.g., a human annotator) may be provided with input textual representations and domain weights specified by a user for a plurality of domains. The annotator may use the user-specific weights and other suitable information (e.g., the annotator's knowledge) to assign a domain to the textual input.

In FIG. 5A, the input textual representation is "Play Harry Potter." This textual representation may refer to one of several different actions that the user would like an electronic device to perform in response to receiving user input corresponding to this textual representation. For example, the user may want to watch the movie "Harry Potter," the user may want to open an app for playing a "Harry Potter" game, the user may want to read the "Harry Potter" book on the electronic device, or the user may want to listen to the "Harry Potter" soundtrack using a music player application. The annotator may use the user-specific domain weights to assign a domain to the textual representation, which the annotator considers to best represent the user's preference, as described above. In the example of FIG. 5A, the user is associated with domain weights of 0.0 for the domain "Movie," 0.2 for the domain "OpenApp," 0.1 for the domain "Book" and 0.9 for the domain "Music." Accordingly, the user has specified a strong preference for music compared to each of the other categories that relate to this textual representation. The annotator may use this information to associate the domain "Music" with the input textual representation "Play Harry Potter" to provide user-tailored ranking training data for this user.

As shown in FIG. 5A, the textual representations in the training data to be processed by an annotator may also be associated with a plurality of NLU hypotheses (e.g., hypotheses 1.1-1.4) and a domain-specific language model score that reflects a strength of association between the words in the textual representation and each of the domains for the plurality of NLU hypotheses. It should be appreciated that NLU hypotheses, language model scores, and user weights are examples of features that may be used to train the ranking classifier, and any other suitable features including, but not limited to, scores associated with NLU hypotheses generated by the NLU engine prior to ranking and historical usage information for a user or a collection of users, may also be used train the ranking classifier.

As shown in FIG. 5A, NLU hypothesis 1.1 associated with the "Movie" domain, and the associated language model score is 0.9, indicating a high degree of association between the words "play Harry Potter" and the category "Movie." By contrast, the language model score of 0.4 for the "Music" domain associated with NLU hypothesis 1.4 indicates a lower degree of association between the textual representation and the "Music" domain.

In some embodiments, the NLU hypothesis information and/or the domain-specific language model information associated with a textual representation in training data may be used in combination with the user-specific domain weights and the domain assigned by an annotator to generate user-specific training data to train a ranking classifier. As shown in FIG. 5B, the user-specific ranking training data may include, for each textual representation, feature sets that include a plurality of features (e.g., the NLU hypothesis information, language model information, and domain weight information). Based on the domain assigned to the textual representation by the annotator in act 414, a target value may be associated with the feature set that includes the assigned domain. For example, as shown in FIG. 5B, based on the weights specified by the user, the annotator has determined that the assigned domain for the textual representation "Play Harry Potter" should be "Music," and a target value of "1" has been associated with the corresponding feature set. All of the feature sets that do not include the domain selected by the annotator may be assigned a target value of "0," as shown in FIG. 5B. The collection of feature sets, including their associated target values, may then be used to train ranking classifier using any suitable training technique. The feature sets illustrated in FIG. 5B are associated with target values of "1" or "0" depending on the domain selected by an annotator. It should be appreciated that any suitable target value may alternatively be used, as the techniques described herein are not limited by the particular value used to identify the selected domain assigned by the annotator.

As should be appreciated from the example shown in FIG. 5A, depending on the user-specific domain weights, the same textual representation may be associated with multiple domains by an annotator. Additionally, the selected domain may be different than the NLU result that would have been output in the absence of the user weight information. For example, although the domain "Movies" had both the highest NLU hypothesis ranking and the largest language model score, for this particular user, the feature set associated with those feature values was determined to likely be incorrect because the user indicated that they were not interested in movies (e.g., the user weight for the domain "Movies" was specified as 0.0). Additionally, even though the feature set associated with the "Music" domain was the lowest-ranked NLU hypothesis and had the lowest language model scores, the feature set associated with the Music domain was identified as being correct by the annotator based on the user's strong interest in this category, as reflected in the 0.9 domain weight assigned by the user for this domain.

Given the set of feature vectors, including a target value, that collectively constitute the training data, the ranking classifier may be trained in any suitable way, including using any of numerous techniques known to those of skill in the art. As discussed above, the illustrative process of FIG. 4 may be repeated for any suitable number of exemplars in a training set (e.g., 50,000 exemplars) to generate a large number of feature sets to train the ranking classifier in accordance with the techniques described herein. As discussed above, the features described in FIG. 5B are merely illustrative, and additional or different features may be included in the training data for training a ranking classifier, as embodiments of the invention are not limited in this respect.

Figure 6:
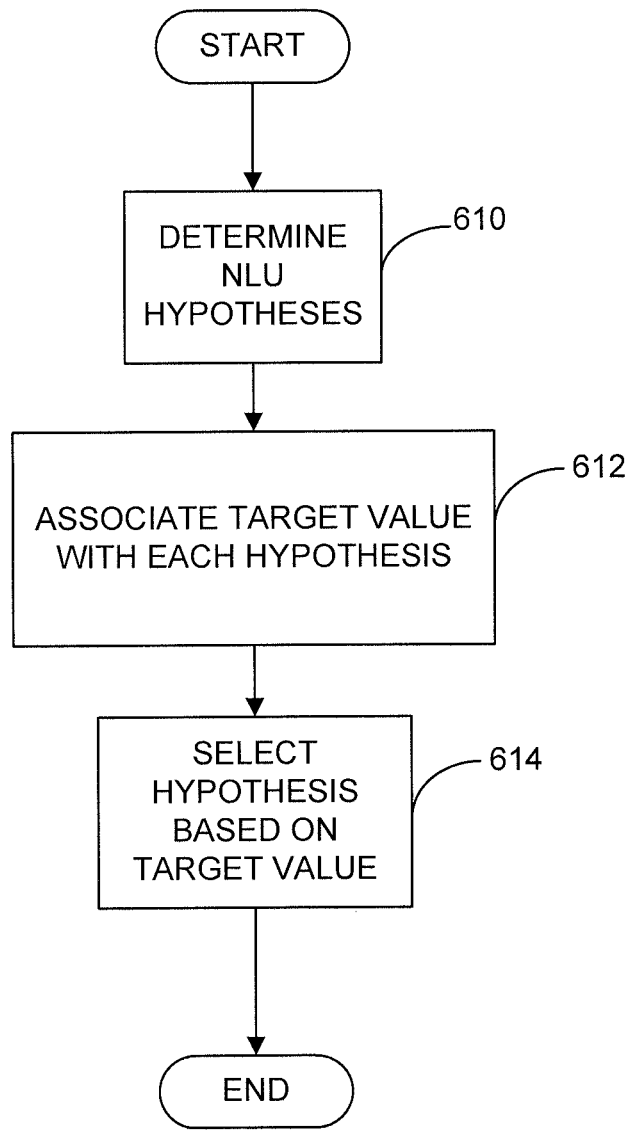
FIG. 6 is a flowchart of an illustrative process for selecting an NLU hypothesis based, at least in part, on user preferences in accordance with some embodiments of the invention.

After training, the trained ranking classifier may be used during run-time to bias output returned from the NLU engine, as discussed above. FIG. 6 shows an illustrative process for using a trained ranking classifier to output NLU results in accordance with some embodiments of the invention. In act 610, a plurality of NLU hypotheses for a textual representation are generated by an NLU engine. The generated NLU hypotheses are associated with a domain and may optionally include additional information including one or more features similar to the features described above for training a ranking classifier. After generating the NLU hypotheses, the process proceeds to act 612 where the ranking classifier trained based, at least in part, on the user weights is used to determine a target value for each of the NLU hypotheses.

Continuing with the example described above in connection with FIGS. 5A and 5B, if, during run-time the NLU hypotheses are those shown in FIG. 5A, NLU hypothesis 1.4 may be associated with a target value of 1 (e.g., correct), whereas all of the other hypotheses may be associated with a target value of 0 (e.g., incorrect). Although the target values illustrated in FIG. 5B are shown as being binary (e.g., a value of 0 or 1), any suitable values may alternatively be used. For example, in some embodiments, the output of the ranking classifier includes floating-point values (e.g., the target values for NLU hypotheses 1.4, 1.2, 1.1, and 1.3 may be 0.75, 0.2, 0.04, and 0.01, respectively), and the floating-point values may be used to re-order the NLU hypotheses to create the final NLU results.

After determining target values for each of the NLU hypotheses, the process proceeds to act 614 where a hypothesis is selected based, at least in part, on its determined target value. In one implementation, the NLU hypotheses may be ranked based, at least in part, on their assigned target values and the NLU hypothesis with the highest ranking may be selected as the most likely hypothesis.

Figure 7:
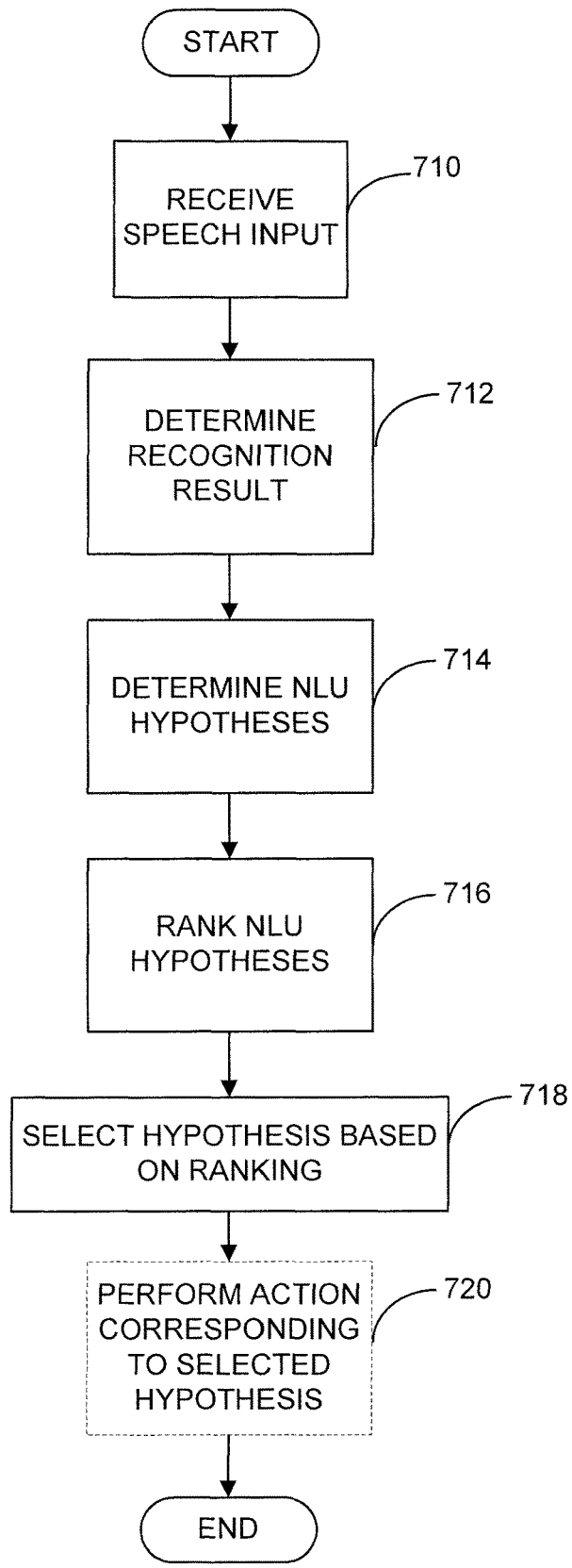
FIG. 7 is a flowchart of an illustrative process for selecting an NLU hypothesis generated based on speech input, wherein the NLU hypothesis is selected based, at least in part, on user preferences in accordance with some embodiments of the invention.

As discussed above, some embodiments employ an ASR engine front end as input to an NLU engine. An illustrative process for selecting an NLU hypotheses generated in response to receiving speech input is shown in FIG. 7. In act 710, speech input is received by an input interface (e.g., a microphone) of an electronic device. The process then proceeds to act 712 where the speech input is processed by a speech recognizer to generate one or more speech recognition results (e.g., N-best results). As discussed above, speech recognition may be performed locally on the electronic device, partially or entirely by a speech recognition engine remotely located from the electronic device and in communication with the device via at least one network, or may be distributed between the local device and one or more remote devices. After determining the speech recognition result(s), the process proceeds to act 714 where the speech recognition result(s) are provided to an NLU engine that determines a plurality of NLU hypotheses for the speech recognition result(s).

After determining the plurality of NLU hypotheses, the process proceeds to act 716 where the trained ranking classifier of the ranking engine ranks the NLU hypotheses, for example, using the process discussed in connection with FIG. 6. The process then proceeds to act 718 where one of the NLU hypotheses is selected based on its associated ranking. In some embodiments, information associated with the selected NLU hypothesis may be output on a display of the electronic apparatus for review by a user. In other embodiments, the selected NLU hypothesis may be used to perform one or more actions associated with the electronic device. In such embodiments, after an NLU hypothesis has been selected, the process proceeds to act 720 where at least one action corresponding to the selected NLU hypothesis is performed. Continuing with the example above, if the recognition result corresponding to the speech input received by the electronic device is determined to be "play Harry Potter," and this textual representation is associated with the domain of "Music," the actions that may be performed in response to selecting this NLU hypothesis may include launching a local or web-based music application, and playing a song corresponding to "Harry Potter." The techniques described herein are not limited to use with determining the playing of music as an intended user action, and can be used to determine any desired user action, non-limiting examples of which include, changing a phone setting, performing a web-search, initiating a phone call, sending a text-based message, initiating a prompt from a virtual agent, and launching any suitable local or web-based application on the electronic device.

Figure 8:
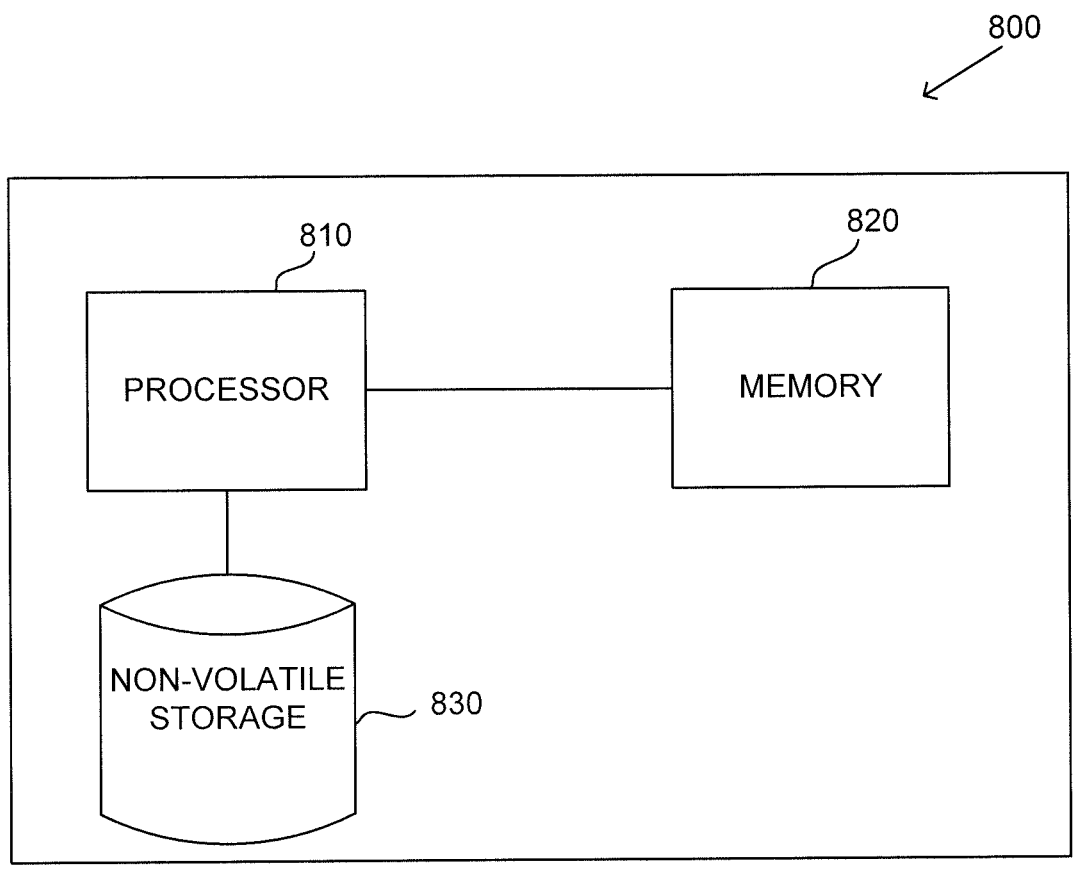
FIG. 8 is an exemplary computer system on which some embodiments of the invention may be implemented.

An illustrative implementation of a computer system 800 that may be used in connection with any of the embodiments of the invention described herein is shown in FIG. 8. The computer system 800 may include one or more processors 810 and one or more computer-readable tangible non-transitory storage media (e.g., memory 820, one or more non-volatile storage media 830, or any other suitable storage device). The processor 810 may control writing data to and reading data from the memory 820 and the non-volatile storage device 830 in any suitable manner, as the aspects of the present invention described herein are not limited in this respect. To perform any of the functionality described herein, the processor 810 may execute one or more instructions stored in one or more computer-readable storage media (e.g., the memory 820), which may serve as tangible non-transitory computer-readable storage media storing instructions for execution by the processor 810.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a USB drive, a flash memory, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of performing natural language processing, the method comprising acts of:
   determining a meaning a user intended to express with a natural language input provided by the user, wherein the determining comprises:
      processing, by a natural language understanding (NLU) engine implemented by one or more processors, a textual representation for the input to determine a plurality of NLU hypotheses, wherein each of the hypotheses indicates a potential meaning of the natural language input and is associated with a candidate domain of a plurality of domains that each relate to a potential area of interest for the user; and
      ranking the plurality of NLU hypotheses using a ranking classifier trained, using training data, to rank NLU hypotheses based at least in part on interests of the user, the training data comprising features based, at least in part, on information specifying a weight for each of the plurality of domains, wherein the weight for a domain from among the plurality of domains indicates a level of interest for the user in the domain; and
   outputting, as the meaning the user intended to express, an NLU hypothesis having a highest ranking from among the ranked plurality of NLU hypotheses.

2. The method of claim 1, further comprising an act of:
   tracking usage information from the user; and
   retraining the ranking classifier based, at least in part, on the usage information.

3. The method of claim 1, further comprising training the ranking classifier using the training data.

4. The method of claim 3, wherein training the ranking classifier further comprises:
   providing the training data as a set of annotated exemplars, wherein each exemplar in the set is associated with a plurality of feature sets, wherein each of the plurality of feature sets comprises values including one of the plurality of domains, the weight for the domain, and a target value.

5. The method of claim 4, wherein the values in each of the plurality of feature sets further includes ranking information determined by at least one speech recognizer and/or at least one NLU engine.

6. The method of claim 5, wherein the values for each of the plurality of feature sets further includes a language model score for the exemplar determined by the at least one speech recognizer.

7. The method of claim 1, further comprising receiving, via a user interface, the information specifying a weight for each of the plurality of domains, wherein specifying a weight for each of a plurality of domains comprises:
   specifying a first weight for a first domain of the plurality of domains based on the information received via the user interface, the information indicating at least a user-specified weight; and
   specifying a second weight for a second domain of the plurality of domains based, at least in part, on the information received via the user interface.

8. A non-transitory computer-readable storage medium encoded with a plurality of instructions that, when executed by a computer, performs a method, the method comprising:
   determining a meaning a user intended to express with a natural language input provided by the user, wherein the determining comprises:
      processing, using a natural language understanding (NLU) engine, a textual representation for the input to determine a plurality of NLU hypotheses, wherein each of the hypotheses indicates a potential meaning of the natural language input and is associated with a candidate domain of a plurality of domains that each relate to a potential area of interest for the user; and
      ranking the plurality of NLU hypotheses based, at least in part, on user-specific information associating a weight with each of the plurality of domains that each relate to a potential area of interest for the user, and wherein the weight associated with the each of the plurality of domains indicates a level of interest for the user in the corresponding domain; and
      selecting an NLU hypothesis having a highest ranking from among the ranked plurality of NLU hypotheses as representing the meaning the user intended to express.

9. The computer-readable storage medium of claim 8, wherein the method further comprises acts of:
   receiving speech input; and
   processing the speech input with a speech recognizer to determine at least a portion of the textual representation.

10. The computer-readable storage medium of claim 8, wherein the processing the textual representation is further performed based, at least in part, on at least one domain-specific language model score.

11. The computer-readable storage medium of claim 8, wherein:
   each of the plurality of NLU hypotheses is associated with a domain for the textual representation,
   ranking the plurality of NLU hypotheses comprises classifying each of the plurality of NLU hypotheses using user-specified information.

12. The computer-readable storage medium of claim 8, wherein the method further comprises the act of:
   initiating at least one action on a mobile device, wherein the at least one action is determined based, at least in part, on the selected NLU hypothesis.

13. The computer-readable storage medium of claim 8, wherein at least one of the plurality of domains is associated with a weight that is user independent.

14. The computer-readable storage medium of claim 8, wherein the method further comprises providing, to a user, a user interface configured to receive additional user input including at least a portion of the user-specific information associating a weight with each of the plurality of domains.

15. The computer-readable storage medium of claim 14, wherein the user-specific information associating a weight with each of a plurality of domains comprises:

a first weight for a first domain of the plurality of domains based on the information received via the user interface, the information indicating at least a user-specified weight; and a second weight for a second domain of the plurality of domains based on the information received via the user interface.

16. A computer system, comprising:
at least one processor programmed to:
   determine a meaning a user intended to express with a natural language input provided by the user, wherein the determining comprises:
      process a textual representation using a natural language understanding (NLU) engine to determine a plurality of NLU hypotheses, wherein each of the hypotheses indicates a potential meaning of the natural language input and is associated with a candidate domain of a plurality of domains that each relate to a potential area of interest for the user;
      rank the plurality of NLU hypotheses using a ranking classifier trained, using training data, to rank NLU hypotheses based at least in part on interests of the user, the training data comprising features based, at least in part, on information specifying a weight for each of the plurality of domains, wherein the weight for a domain from among the plurality of domains indicates a level of interest for the user in the domain; and
      output, as the meaning the user intended to express, an NLU hypothesis having a highest ranking from among the ranked plurality of NLU hypotheses.

17. The computer system of claim 16, further comprising a user interface configured to receive the information specifying a weight for each of the plurality of domains, wherein specifying a weight for each of a plurality of domains comprises:

specifying a first weight for a first domain of the plurality of domains based on the information received via the user interface, the information indicating at least a user-specified weight; and specifying a second weight for a second domain of the plurality of domains based, at least in part, on the first weight specified for the first domain.

18. The computer system of claim 17, wherein specifying the weight for the second domain of the plurality of domains is performed without receiving user input directly specifying the weight for the second domain.

19. The computer system of claim 16, wherein the at least one processor is further programmed to:
   track usage information from the user; and
   retrain the trained ranking classifier based, at least in part, on the usage information.

20. The computer system of claim 16, wherein the at least one processor is further programmed to train the trained ranking classifier using the training data.

21. The computer system of claim 20, wherein training the ranking classifier further comprises:
   providing the training data as a set of annotated exemplars, wherein each exemplar in the set is associated with a plurality of feature sets, wherein each of the plurality of feature sets comprises values including one of the plurality of domains, the weight for the domain, and a target value.

22. The computer system of claim 21, wherein the values in each of the plurality of feature sets further includes ranking information determined by a speech recognizer and/or an NLU engine.

23. The computer system of claim 22, wherein the values for each of the plurality of feature sets further includes a language model score for the exemplar determined by the speech recognizer.

* * * * *